(12) United States Patent
Shashindranath et al.

(10) Patent No.: US 8,588,375 B1
(45) Date of Patent: Nov. 19, 2013

(54) SYSTEM AND METHOD FOR PROCESSING EMERGENCY CALLS

(75) Inventors: Ashwin Shashindranath, Overland Park, KS (US); Daniel V. Steinel, Lenexa, KS (US); Anthony Charles Wells, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1240 days.

(21) Appl. No.: 12/431,156

(22) Filed: Apr. 28, 2009

(51) Int. Cl.
*H04M 11/04* (2006.01)

(52) U.S. Cl.
USPC .................................. 379/46; 379/210.02

(58) Field of Classification Search
USPC ......... 379/36–51, 210.01, 210.02; 455/404.1, 455/521
See application file for complete search history.

(56) References Cited

U.S. PATENT DOCUMENTS

| | | | |
|---|---|---|---|
| 2005/0124316 A1* | 6/2005 | Islam et al. | 455/404.2 |
| 2007/0201646 A1* | 8/2007 | Metcalf | 379/142.01 |
| 2009/0253399 A1* | 10/2009 | Snapp | 455/404.1 |

* cited by examiner

*Primary Examiner* — Fan Tsang
*Assistant Examiner* — Akelaw Teshale

(57) ABSTRACT

A communication system to handle call-back calls from emergency services to callers comprises a communication network and a call processing system. The communication network is configured to receive an emergency call for an emergency service from a communication device operated by a caller, and receive an incoming call for the communication device. The call processing system is configured to, in response to the emergency call, modify call controls associated with the caller, and process the modified call controls associated with the caller to determine if the incoming call is allowed. The communication network is further configured to connect the incoming call if the incoming call is allowed, and to block the incoming call if the incoming call is not allowed.

20 Claims, 8 Drawing Sheets

SYSTEM AND METHOD FOR PROCESSING EMERGENCY CALLS

TECHNICAL FIELD

This invention is related to the field of communications, and in particular, to communications networks, systems, and methods for handling emergency calls.

TECHNICAL BACKGROUND

Telecommunications carriers are required by government regulations to provide emergency calling services to their customers. In the United States and Canada, 9-1-1 is the official emergency phone number that callers can dial to reach dispatch personnel at a public safety answering point (PSAP). When a caller dials 9-1-1 from a telephone, the call is routed by a carrier to receiving equipment at a PSAP facility. A dispatcher at the facility answers the call and assists the caller with the emergency.

Frequently, operators must dispatch various types of first responder personnel to the scene of an emergency, such as firemen, police, or paramedics, to render assistance based upon the emergency communicated by the caller. While response personnel may be able to determine the location of the caller via GPS or other means, the response personnel may need to obtain other information from the caller to determine the type of emergency so that the appropriate first responders and the necessary equipment can be dispatched.

However, a problem arises if an emergency caller is disconnected from a PSAP operator before the operator obtains all necessary information, due to a dropped call, dead battery, or accidental hang up, for example. Thus, there may be circumstances in which the emergency personnel need to call back the emergency caller. Unfortunately, some callers have calling plans set to block incoming calls under certain conditions, such as during certain timeframes or after a predetermined number of minutes have been used. Other calling plans only permit incoming calls from particular phone numbers. These types of calling plans may be set up by employers for employee phones, or by parents to control their children's telephone usage. Unfortunately, emergency personnel or others may be unable to connect to communication devices with calling plan restrictions during an emergency.

Overview

A method of operating a communication system to handle call-back calls from emergency services to callers comprises receiving an emergency call from a caller for an emergency service, in response to the emergency call, modifying call controls associated with the caller, receiving an incoming call for the caller, processing the modified call controls associated with the caller to determine if the incoming call is allowed, if the incoming call is allowed, connecting the incoming call, and if the incoming call is not allowed, blocking the incoming call.

A communication system to handle call-back calls from emergency services to callers comprises a communication network and a call processing system. The communication network is configured to receive an emergency call for an emergency service from a communication device operated by a caller, and receive an incoming call for the communication device. The call processing system is configured to, in response to the emergency call, modify call controls associated with the caller, and process the modified call controls associated with the caller to determine if the incoming call is allowed. The communication network is further configured to connect the incoming call if the incoming call is allowed, and to block the incoming call if the incoming call is not allowed.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
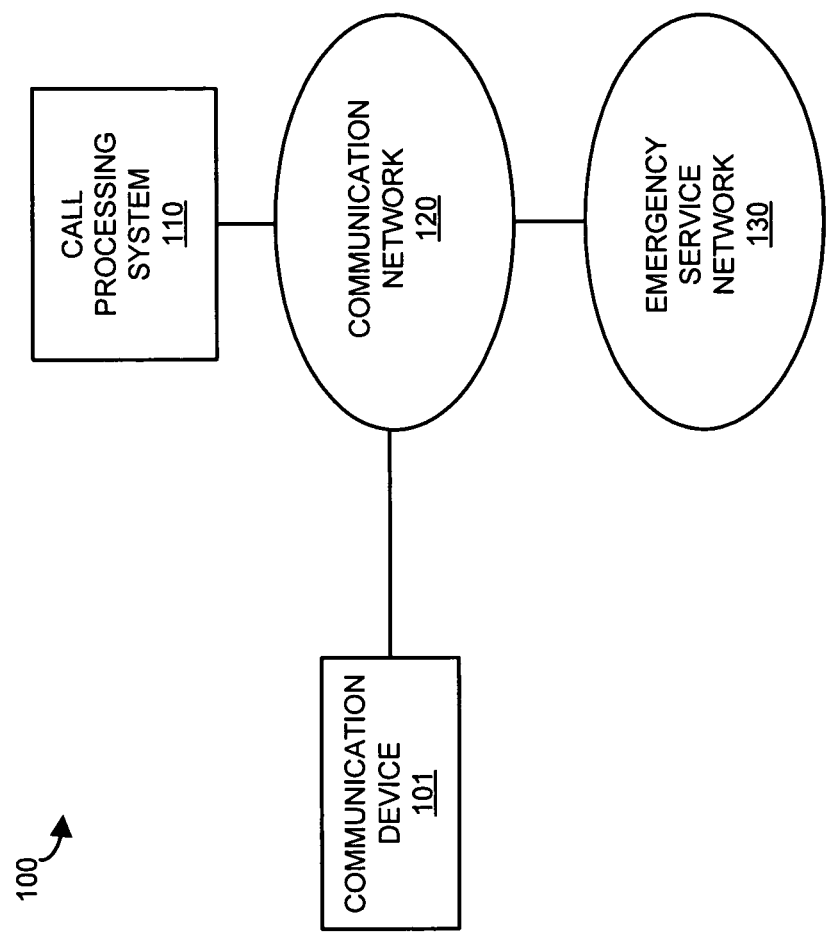
FIG. 1 is a block diagram that illustrates a communication system.

FIG. 1 is a block diagram that illustrates communication system 100. Communication system 100 includes communication device 101, call processing system 110, communication network 120, and emergency service network 130. Communication device 101 is connected to communication network 120. Communication network 120 is connected to call processing system 110 and emergency service network 130. Communication device 101 comprises hardware and circuitry programmed to function as a telecommunications device. Communication device 101 comprises any device capable of placing emergency calls via communication network 120, such as a telephone, transceiver, smartphone, mobile phone, cellular phone, personal digital assistant (PDA), personal communicator, handheld game console, Internet access device, personal computer (PC), Ultra-Mobile personal computer (UMPC), handheld television, or some other consumer apparatus with communication capabilities—including combinations thereof.

Communication network 120 comprises any network or collection of networks capable of receiving emergency calls from communication device 101 and connecting the calls to emergency service network 130. For example, communication network 120 could comprise a packet-switched network, such as the Internet, a public switched telephone network (PSTN), a PacketCable network, a Network Call Signaling (NCS) network, a personal communication service (PCS) network, a local area network (LAN), a wide area network (WAN), a wireless communication network, or any other network that provides a communication service to communication device 101—including combinations thereof. Communication network 120 may utilize many protocols for communication, such as Internet Protocol (IP), Asynchronous Transfer Mode (ATM), frame relay, Session Initiation Protocol (SIP), Voice over Internet Protocol (VoIP), Media Gateway Control Protocol (MGCP), Signaling Gateway Control Protocol (SGCP), H.248, and H.323, for example. Communication network 120 is in communication with call processing system 110 and emergency service network 130.

Emergency service network 130 comprises any network or collection of networks capable of receiving and terminating an emergency call from communication network 120. Emergency service network 130 could comprise various network elements, such as routers, servers, processors, and switches, well known in the art for the provisioning and delivery of communication services. For example, emergency service network 130 could comprise telecommunications equipment such as a selective router and an Automatic Location Identification (ALI) database. In addition, emergency service network 130 comprises an emergency service such as a police service, fire service, emergency medical service, Government Emergency Telecommunications Service (GETS), Public Safety Answering Point (PSAP), or some other emergency service network—including combinations thereof. In one example, emergency service network 130 comprises any emergency service network that can be reached through a dedicated emergency telephone number reserved for critical emergency calls. In the United States the universal emergency number is 9-1-1. Areas outside the United States may use different universal emergency numbers. For example, many countries outside the United States use 1-1-2 or 9-9-9 as a universal emergency number.

Call processing system 110 comprises computer and communication equipment and software. Call processing system 110 may be a discrete system or may be integrated within other systems—including other systems within communication network 120. Call processing system 110 may reside in a single device or may be distributed across multiple devices. Call processing system 110 comprises any system capable of processing calls placed using communication device 101 over communication network 120. Processing a call may include providing information regarding call controls or restrictions associated with communication device 101 or a particular caller using communication device 101.

Figure 2:
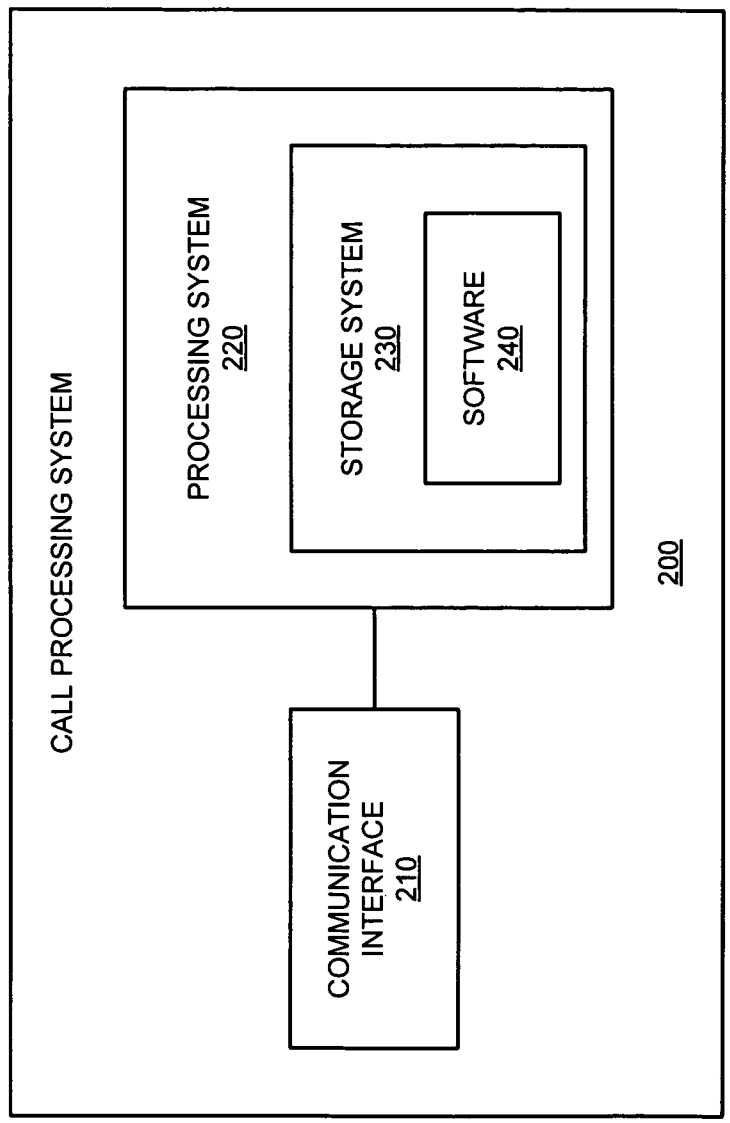
FIG. 2 is a block diagram that illustrates a call processing system.

FIG. 2 is a block diagram that illustrates call processing system 200. Call processing system 200 provides an example of call processing system 110, although system 110 may use other configurations. Call processing system 200 includes communication interface 210 and processing system 220. Processing system 220 includes storage system 230. Storage system 230 stores software 240. Processing system 220 is linked to communication interface 210. Call processing system 200 may be comprised of a programmed general purpose computer, although those skilled in the art will appreciate that programmable or special purpose circuitry and equipment may be used. Call processing system 200 may be distributed among multiple devices that together comprise elements 210-240.

Communication interface 210 may comprise a network interface card, modem, port, transceiver, or some other communication device. Communication interface 210 may be distributed among multiple communication devices. Processing system 220 may comprise a computer microprocessor, logic circuit, or some other processing device. Processing system 220 may be distributed among multiple processing devices. Storage system 230 may comprise a disk, tape, integrated circuit, server, or some other memory device. Storage system 230 may be distributed among multiple memory devices. Although storage system 230 is shown within call processing system 200, a portion of storage system 230 could be externally located. For example, storage system 230 may comprise an external memory apparatus that stores software 240 for subsequent transfer to an internal memory device within call processing system 200.

Processing system 220 retrieves and executes software 240 from storage system 230. Software 240 may comprise an operating system, utilities, drivers, networking software, and other software typically loaded onto a computer system. Software 240 may also comprise an application program, firmware, or some other form of machine-readable processing instructions. When executed by the processing system 220, software 240 directs processing system 220 to operate as described herein for call processing system 200.

Figure 3:
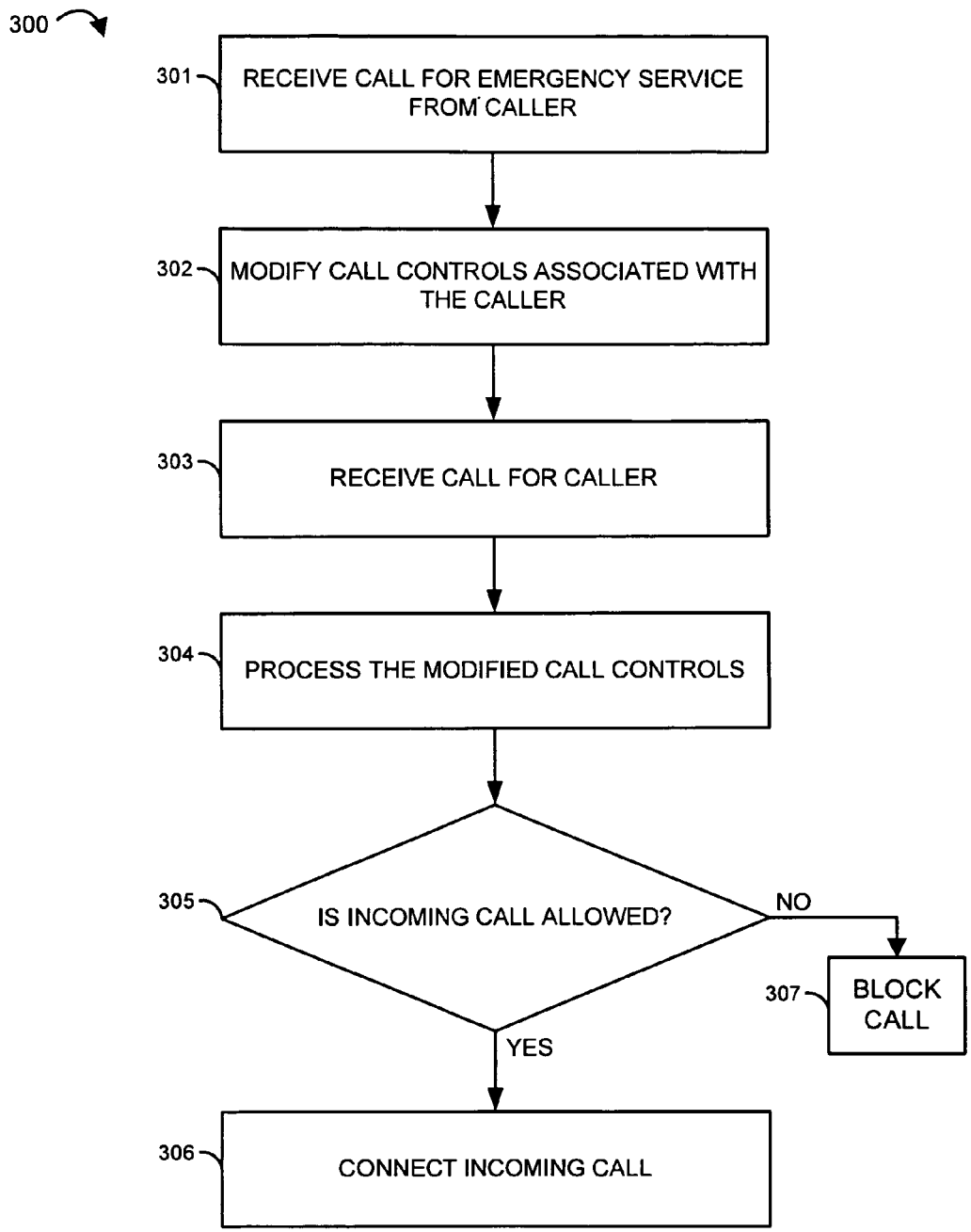
FIG. 3 is a flow diagram that illustrates a method of operating a communication system.

FIG. 3 is a flow diagram that illustrates a method 300 of operating communication system 100. Method 300 provides operational steps for a communication service provider to process an emergency call from communication device 101 and handle subsequent incoming calls to the communication device. To begin, communication network 120 receives a call for an emergency service from a caller using communication device 101 (operation 301). In response to the emergency call, call processing system 110 modifies call controls associated with the caller using communication device 101 (operation 302) to allow call-back calls to communication device 101 that might otherwise be restricted. Later, an incoming call for communication device 101 is received by communication network 120 (operation 303). The modified call controls are processed by call processing system 110 to determine if the incoming call is allowed (operation 304). A determination is made regarding whether the incoming call to the caller is permitted based on the modified call controls (operation 305). If the incoming call is permitted, the call is connected (operation 306). If the incoming call is not permitted, the call is blocked (operation 307).

Figure 4:
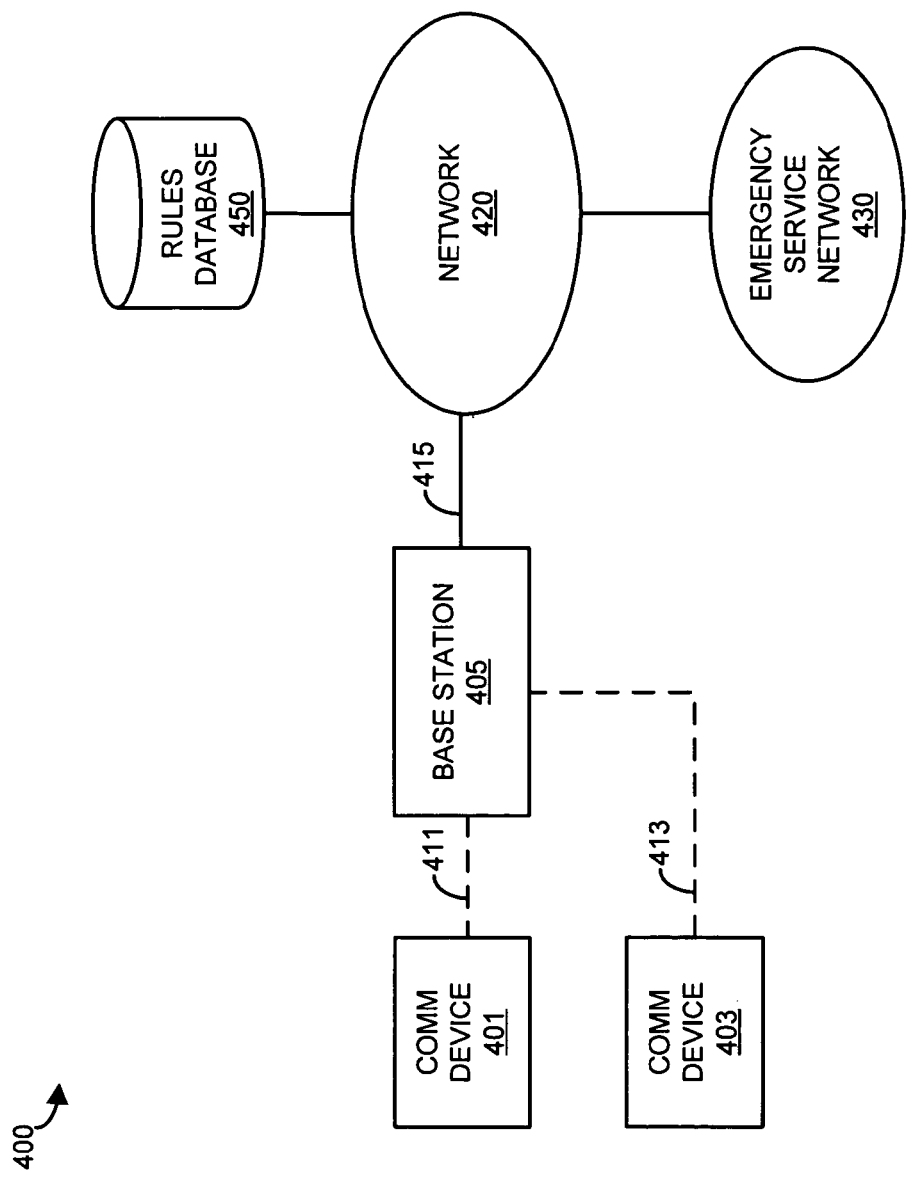
FIG. 4 is a block diagram that illustrates a communication system.

FIG. 4 is a block diagram that illustrates communication system 400. Communication system 400 includes communication device 401, communication device 403, base station 405, network 420, emergency service network 430, and rules database 450. Communication device 401 is in communication with base station 405 over wireless link 411. Communication device 403 is in communication with base station 405 over wireless link 413. While communication device 403 is shown connected to base station 405 for clarity, communication device 403 may be connected to a different base station or access node, or may be connected directly to network 420 over a wired connection, without wirelessly communicating with base station 405. Base station 405 is in communication with network 420 over backhaul link 415. Network 420 is connected to emergency service network 430 and rules database 450.

Communication device 401 comprises hardware and circuitry programmed to function as a telecommunications device. Communication device 401 comprises any device capable of placing emergency calls to emergency service network 430 via base station 405 and network 420, such as a telephone, transceiver, smartphone, mobile phone, cellular phone, personal digital assistant (PDA), personal communicator, handheld game console, Internet access device, personal computer (PC), Ultra-Mobile personal computer (UMPC), handheld television, or some other consumer apparatus with communication capabilities—including combinations thereof.

Communication device 403 comprises hardware and circuitry programmed to function as a telecommunications device. Communication device 403 comprises any device capable of sending and receiving voice calls, such as a telephone, transceiver, smartphone, mobile phone, cellular phone, PDA, personal communicator, handheld game console, Internet access device, PC, UMPC, handheld television, or some other consumer apparatus with communication capabilities—including combinations thereof.

Communication devices 401 and 403 are in communication with base station 405 over wireless links 411 and 413, respectively. Wireless communication links 411 and 413 use the air or space as the transport media. These wireless communication links 411 and 413 may use various wireless communication protocols, such as Code Division Multiple Access (CDMA), Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), Wi-Fi, Internet, telephony, or some other communication format—including combinations thereof.

Base station 405 may comprise any wireless system that provides an air interface to communication devices 401 and 403 and communication connectivity to network 420. Examples of base stations that may be utilized include base transceiver stations (BTSs), base station controllers (BSCs), base stations (BSs), radio base stations (RBSs), Node B, enhanced Node B (eNB), and others. Base station 405 may include a number of elements known to those skilled in the art comprising a transceiver, power amplifier, combiner, duplexer, antenna, and control function. Further, base station 405 may comprise one antenna or multiple antennas having corresponding sectors and frequency assignments. Base station 405 may have several transceivers and corresponding antennas which allow it to serve several different frequencies and different sectors of the base station.

Base station 405 is in communication with network 420 via backhaul link 415. Backhaul link 415 comprises any intermediate communication link over which base station 405 exchanges communications with elements in network 420. Backhaul links are well known in the art and may comprise wired or wireless connections, communication elements, or even communication networks, which facilitate communication between base station 405 and network 420. Examples of backhaul links include, but are not limited to, T-carrier links such as T1/T3, synchronous transport module (STM-1) links, optical carrier (OC) links such as OC-3, point-to-point microwave radio relay transmission links, point-to-multipoint microwave access technologies, such as worldwide interoperability for microwave access (WiMAX) links, Ethernet links, or any other communication link.

Network 420 comprises communication equipment and network elements capable of providing a communication service to communication device 401 and 403. Network 420 may include various network elements, such as routers, servers, processors, and switches, well known in the art for the provisioning and delivery of communication services. Network 420 is in communication with emergency service network 430 and rules database 450.

Emergency service network 430 comprises any network or collection of networks capable of receiving and terminating an emergency call. Emergency service network 430 could comprise various network elements, such as routers, servers, processors, and switches, well known in the art for the provisioning and delivery of communication services. For example, emergency service network 430 could comprise telecommunications equipment such as a selective router and an Automatic Location Identification (ALI) database. In addition, emergency service network 430 comprises an emergency service such as a police service, fire service, emergency medical service, Government Emergency Telecommunications Service (GETS), Public Safety Answering Point (PSAP), or some other emergency service network—including combinations thereof. In one example, emergency service network 430 comprises any emergency service network that can be reached through a dedicated emergency telephone number reserved for critical emergency calls. In the United States the universal emergency number is 9-1-1. Areas outside the United States may use different universal emergency numbers. For example, many countries outside the United States use 1-1-2 or 9-9-9 as a universal emergency number.

Rules database 450 comprises any database or system capable of storing rules or call controls associated with a particular caller or a communication device 401 or 403. For example, rule database 450 could comprise a disk, tape, integrated circuit, server, or some other memory device. Rules database 450 may reside in a single device or may be distributed among multiple memory devices. The rules or call controls stored in rules database 450 may include rules associated with individuals authorized to make calls or receive calls therefrom, timeframes during which calls may be placed or received, or other restrictions on the ability of a caller or a communication device to make or receive calls—including combinations thereof.

Figure 5:
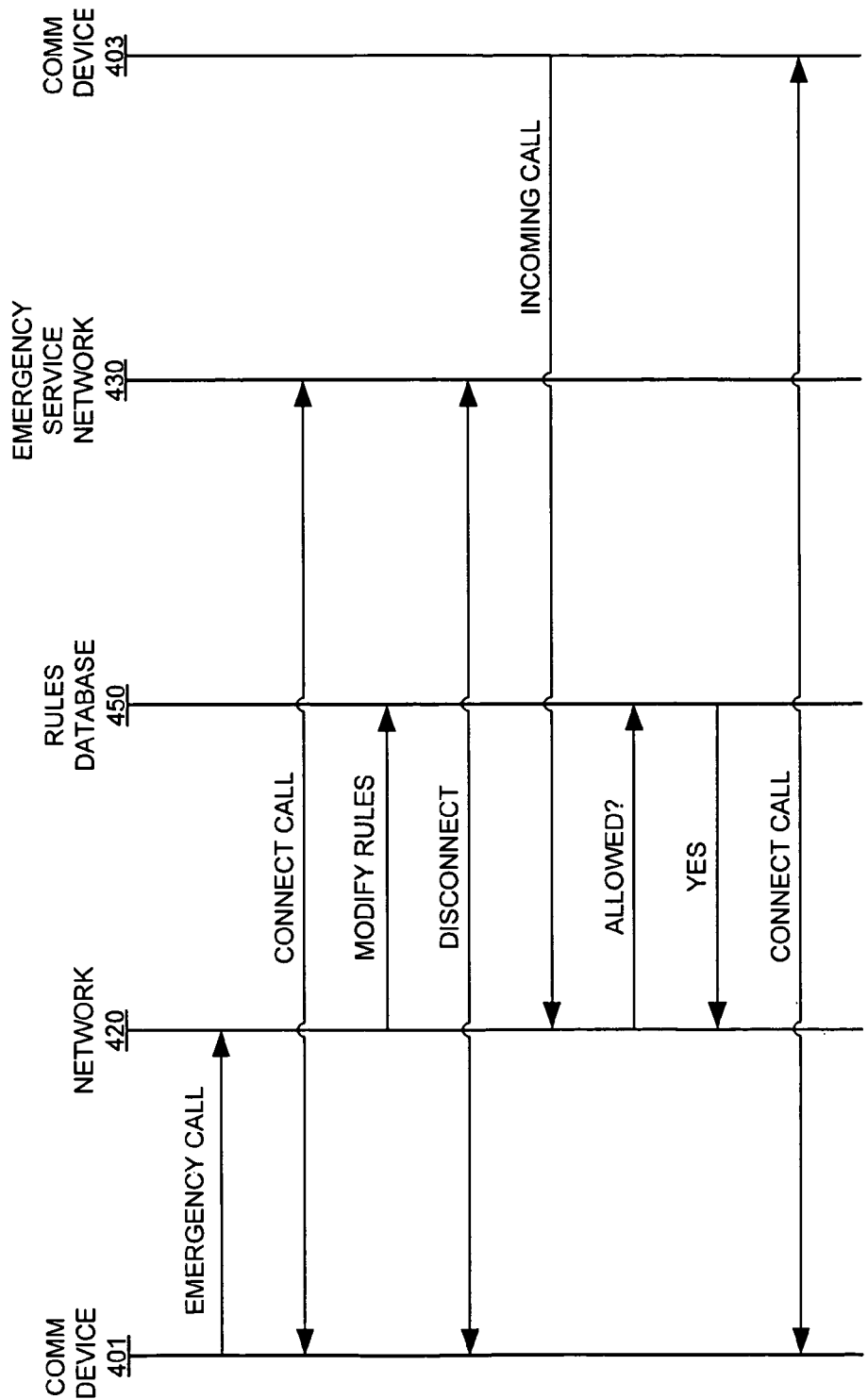
FIG. 5 is a sequence diagram that illustrates a method of operating a communication system.

FIG. 5 is a sequence diagram that illustrates an operation of communication system 400. A caller operating communication device 401 places an emergency call to emergency service network 430, such as by dialing 9-1-1. The call is transferred to network 420. In response to receiving the emergency call, network 420 connects communication device 401 to an operator within emergency service network 430. In addition, either simultaneously with connecting the call or immediately thereafter, network 420 instructs rules database 450 to modify the call controls associated with communication device 401. The call controls, or rules, place certain restrictions on the use of communication device 401, such as a list of approved numbers from which incoming calls may be received, various time limits on incoming calls, denying incoming or outgoing calls after a predetermined amount of call minutes are exceed in a predetermined period, a time period during which incoming calls may be accepted or rejected, such as various times of the day or days of the week, or other call restrictions—including combinations thereof. Further, call controls may be associated with a specific caller, rather than a specific device. For example, the specific caller using communication device 401 to place the emergency call in FIG. 5 may have associated call controls.

When network 420 instructs rules database 450 to modify the rules associated with communication device 401, some or all of the call controls associated with communication device 401 may be modified for a predetermined time. For example, when instructed to modify the rules associated with communication device 401, all call controls associated with communication device 401 may be temporarily suspended for a period of one hour. By suspending the rules for a predetermined time period, any incoming calls to or outgoing calls from communication device 401 will not be restricted, in order to avoid any hindrance in responding to the emergency situation.

In addition, modifying call controls associated with the caller or communication device 401 could comprise modifying call controls for a predetermined time for all communication devices presently served by the base station or sector serving the communication device placing the emergency call. Further, modifying call controls could comprise modifying the call controls for all communication devices on the contact list of the communication device placing the emergency call, or for all communication devices that the communication device placing the emergency call has previously called or received calls from within a predetermined time period, such as one week or one month. In another example, modifying call controls associated with communication device 401 could comprise a global modification by modifying call controls for all communication devices within a predetermined geographical area associated with communication device 401, such as a half mile radius, square mile, or government jurisdiction like a city, county, or state. In order to perform such a global modification of call controls of all communication devices within a predetermined geographical area associated with communication device 401, the location of communication device 401 must be acquired through various location determination techniques known to those skilled in the art.

Referring again to FIG. 5, after rules database 450 has modified the rules associated with communication device 401, communication device 401 may then be disconnected from emergency service network 430, due to a network failure, user error, or through natural termination of the call, for example.

Subsequently, communication device 403 places an incoming call to communication device 401. Since communication device 401 has associated call control restrictions, network 420 queries rules database 450 to determine if the incoming call to communication device 401 is allowed. In FIG. 5, rules database 450 responds to the inquiry from network 420 and indicates that the incoming call from communication device 403 is allowed. For example, the call controls in rules database 450 may have been modified for a predetermined time period as discussed above, and the incoming call from communication device 403 may have been received during the predetermined time period. In another example, the rules in rules database 450 may have been modified to allow all incoming calls for a predetermined time from communication devices connected to base station 405 that serves device 401, thus allowing the incoming call from communication device 403 which is also served by base station 405. In any event, since rules database 450 indicates that the incoming call from communication device 403 is allowed, network 420 connects the call from communication device 403 to communication device 401.

Various example scenarios will now be discussed in which the previously described process may be employed. In one example, once the emergency call is placed by communication device 401, a disconnection may occur due to a network error, system error, hardware error, or human error, for example. After the call is disconnected, the emergency service network 430 may attempt to call back communication device 401 to resume the call. If the caller or communication device 401 has associated call control restrictions, the call may be blocked by network 420. Therefore, when the initial emergency call is placed, network 420 instructs rules database 450 to modify rules or call controls associated with the caller or communication device 401 to allow incoming calls to communication device 401 for a predetermined time period. In such a case, when emergency service network 430 attempts to place a call-back call to communication device 401, the incoming call from emergency service network 430 will be permitted.

In another example, parents may limit their child's phone to allow incoming calls from preset phone numbers or only during certain time periods, such as outside of the child's school and sleeping hours. Thus, if communication device 401 has such limits in place, incoming calls to communication device 401 may not be allowed by network 420, which is problematic in an emergency situation. For example, a child may witness an emergency and dial 9-1-1 using communication device 401 during a restricted time period, such as during school hours. If the call is disconnected, under normal circumstances personnel at emergency service network 430 would have identified communication device 401 and would attempt a call-back call to determine the nature of the emergency or to provide assistance until emergency personnel arrive on the scene. If call controls associated with the child or with communication device 401 are in effect, the call-back call from emergency service network 430 would not be allowed. However, if the call controls associated with the child or communication device 401 in rules database 450 are modified, the incoming call from emergency service network 430 would be permitted.

In another example, an emergency may affect a large area. For example, a terrorist attack, or a natural disaster like a hurricane, tornado, flood, or earth quake, may impact an entire geographic region. In such a situation, various individuals may wish to place calls to others regarding the emergency. Thus, when a caller in the emergency zone uses communication device 401 to place an emergency call, network 420 may instruct the rules database 450 to modify the call controls for a predetermined time for all communication devices served by the base station serving communication device 401 (i.e., base station 405). Additionally or alternatively, network 420 may instruct the rules database 450 to modify the call controls for a predetermined time for all communication devices within a predetermined geographical area associated with the emergency, or associated with communication device 401. After the initial emergency call is placed by communication device 401 and the associated rules have been modified, communication device 401 may place outgoing calls or receive incoming calls outside of the normal call control restrictions stored in the rules database for communication device 401. In another embodiment, network 420 may become independently aware of an emergency affecting a large area, and may modify the rules associated with all communication devices in the affected geographic area for a predetermined time period in order to facilitate the resolution of the emergency.

Figure 6:
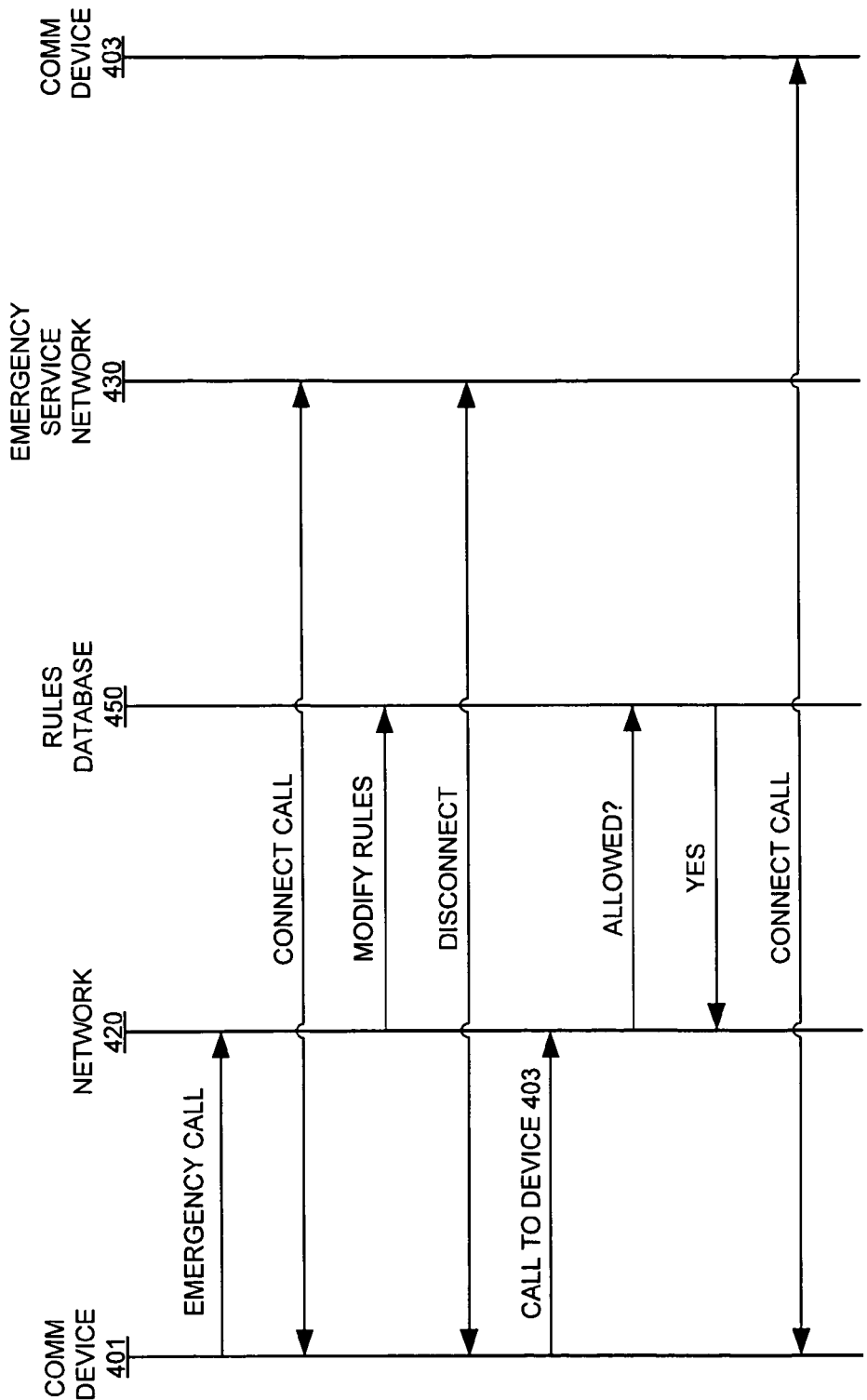
FIG. 6 is a sequence diagram that illustrates a method of operating a communication system.

FIG. 6 is a sequence diagram that illustrates an operation of communication system 400. A caller operating communication device 401 places an emergency call to emergency service network 430, such as by dialing 9-1-1. The call is transferred to network 420. In response to receiving the emergency call, network 420 connects communication device 401 with emergency service network 430, and instructs rules database 450 to modify the call controls associated with communication device 401. The call controls, or rules, place certain restrictions on the use of communication device 401, such as a list of approved numbers from which incoming calls may be received, various time limits on incoming calls, denying incoming or outgoing calls after a predetermined amount of call minutes are exceed in a predetermined period, a time period during which incoming calls may be accepted or rejected, such as various times of the day or days of the week, or other call restrictions—including combinations thereof.

Communication device 401 may then be disconnected from emergency service network 430, for example due to a network failure, user error, or through natural termination of the call. Subsequently, communication device 401 attempts to place an outgoing call to communication device 403. Since communication device 401 has associated call control restrictions, network 420 queries rules database 450 to determine if the outgoing call to communication device 403 is allowed.

In this example, the service provider serving communication device 401 has temporarily restricted incoming or outgoing calls, and only allows emergency calls to 9-1-1. This restriction may have been placed on communication device 401 because the account associated with communication device 401 is delinquent or has gone over the calling time limit for a specified period. However, in this emergency situation, the caller using communication device 401 may need to call other people to inform them of the emergency. The call control restrictions placed on communication device 401 were temporarily suspended when the caller placed the call to emergency service network 430 and network 420 modified the rules in rules database 450 in response to the emergency call. Thus, rules database 450 responds to network 420, informing the network that communication device 401 is allowed to place the outgoing call to communication device 403 due to a temporary suspension of the rules. Network 420 then connects the call between communication device 401 and communication device 403.

In one example scenario of the operation of FIG. 6, a teenager may witnesses a house on fire, but has exceeded the allotted calling minutes for the month on communication device 401. If the teenager dials 9-1-1 from communication device 401 to reach emergency service network 430, the teenager will be connected to emergency service network 430, report the fire and request assistance, and complete the call. However, the teenager may know the occupants of the house. After placing the call to emergency services, the teenager may wish to call the occupants of the house to inform them of the fire and perhaps guide them to a safe egress point away from the fire. Thus, in response to receiving the initial call to emergency service network 430, network 420 may remove the call controls on communication device 401 that restrict outgoing calls for a predetermined time period, thus allowing the teenager to make any necessary calls to warn others of the emergency.

Figure 7:
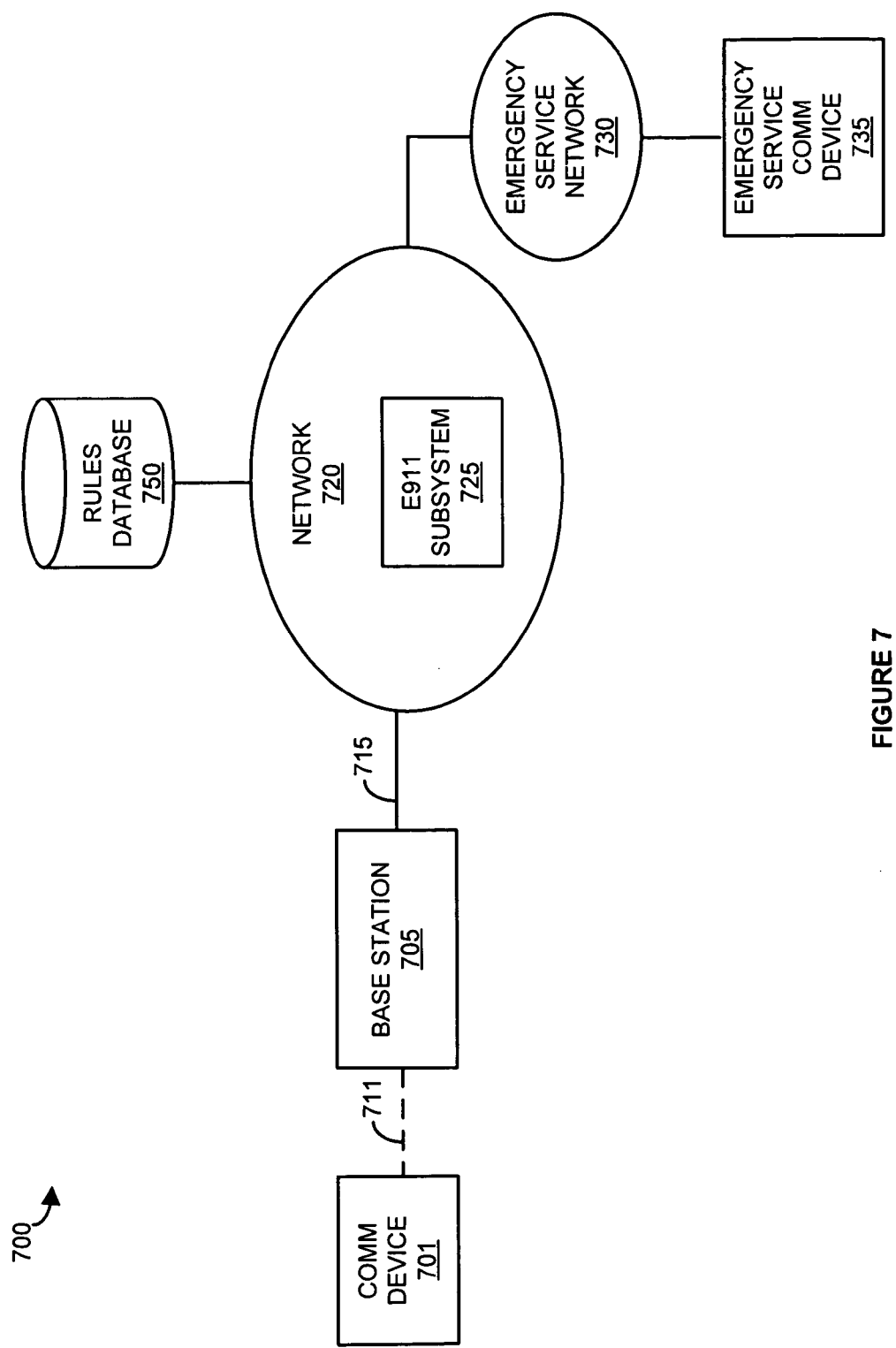
FIG. 7 is a block diagram that illustrates a communication system.

FIG. 7 is a block diagram that illustrates communication system 700. Communication system 700 includes communication device 701, base station 705, network 720, emergency service network 730, emergency service communication device 735, and rules database 750. Network 720 includes E911 subsystem 725. Communication device 701 is in communication with base station 705 over wireless link 711. Base station 705 is in communication with network 720 over backhaul link 715. Network 720 is connected to emergency service network 730 and rules database 750. Emergency service communication device 735 is connected to emergency service network 730.

Communication device 701 comprises hardware and circuitry programmed to function as a telecommunications device. Communication device 701 comprises any device capable of placing emergency calls to emergency service network 730 via base station 705 and network 720, such as a telephone, transceiver, smartphone, mobile phone, cellular phone, personal digital assistant (PDA), personal communicator, handheld game console, Internet access device, personal computer (PC), Ultra-Mobile personal computer (UMPC), handheld television, or some other consumer apparatus with communication capabilities—including combinations thereof.

Communication device 701 is in communication with base station 705 over wireless link 711. Wireless communication link 711 uses the air or space as the transport media. Wireless communication link 711 may use various wireless communication protocols, such as Code Division Multiple Access (CDMA), Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), Wi-Fi, Internet, telephony, or some other communication format—including combinations thereof.

Base station 705 may comprise any wireless system that provides an air interface to communication device 701 and communication connectivity to network 720. Examples of base stations that may be utilized include base transceiver stations (BTSs), base station controllers (BSCs), base stations (BSs), radio base stations (RBSs), Node B, enhanced Node B (eNB), and others. Base station 705 may include a number of elements known to those skilled in the art comprising a transceiver, power amplifier, combiner, duplexer, antenna, and control function. Further, base station 705 may comprise one antenna or multiple antennas having corresponding sectors and frequency assignments. Base station 705 may have several transceivers and corresponding antennas which allow it to serve several different frequencies and different sectors of the base station.

Base station 705 is in communication with network 720 via backhaul link 715. Backhaul link 715 comprises any intermediate communication link over which base station 705 exchanges communications with elements in network 720. Backhaul links are well known in the art and may comprise wired or wireless connections, communication elements, or even communication networks, which facilitate communication between base station 705 and network 720. Examples of backhaul links include, but are not limited to, T-carrier links such as T1/T3, synchronous transport module (STM-1) links, optical carrier (OC) links such as OC-3, point-to-point microwave radio relay transmission links, point-to-multipoint microwave access technologies, such as worldwide interoperability for microwave access (WiMAX) links, Ethernet links, or any other communication link.

Network 720 comprises communication equipment and network elements capable of providing a communication service to communication device 701. Network 720 may include various network elements, such as routers, servers, processors, and switches, well known in the art for the provisioning and delivery of communication services.

Network 720 includes E911 subsystem 725. E911 subsystem 725 comprises computer and communication equipment and software. For example, E911 subsystem 725 could comprise a communication interface to send and receive communications, and a processing system and associated circuitry to process data and machine-readable instructions. E911 subsystem 725 may be a discrete system or may be integrated within other systems—including other systems within communication network 720. E911 subsystem 725 may reside in a single device or may be distributed across multiple devices. E911 subsystem 725 comprises any system capable of processing calls placed using communication device 701 over communication network 720. Processing a call may include providing information regarding call controls or restrictions associated with communication device 701 or a particular caller using communication device 701.

Rules database 750 is any database or system capable of storing rules or call controls associated with a particular caller or a communication device 701. For example, rule database 750 could comprise a disk, tape, integrated circuit, server, or some other memory device. Rules database 750 may reside in a single device or may be distributed among multiple memory devices. The rules or call controls stored in rules database 750 may include rules associated with individuals authorized to make calls or receive calls therefrom, timeframes during which calls may be placed or received, or other restrictions on the ability of a caller or a communication device to make or receive calls—including combinations thereof.

Emergency service network 730 comprises any network or collection of networks capable of receiving and terminating an emergency call. Emergency service network 730 could comprise various network elements, such as routers, servers, processors, and switches, well known in the art for the provisioning and delivery of communication services. For example, emergency service network 730 could comprise telecommunications equipment such as a selective router and an Automatic Location Identification (ALI) database. In addition, emergency service network 730 comprises an emergency service such as a police service, fire service, emergency medical service, Government Emergency Telecommunications Service (GETS), Public Safety Answering Point (PSAP), or some other emergency service network—including combinations thereof. In one example, emergency service network 730 comprises any emergency service network that can be reached through a dedicated emergency telephone number reserved for critical emergency calls. In the United States the universal emergency number is 9-1-1. Areas outside the United States may use different universal emergency numbers. For example, many countries outside the United States use 1-1-2 or 9-9-9 as a universal emergency number.

Emergency service communication device 735 is in communication with emergency service network 730. Emergency service communication device 735 is capable of transmitting and receiving voice data. Emergency service communication device 735 comprises hardware and circuitry programmed to function as a telecommunications device. For example, emergency service communication device 735 comprises a telephone, a wireless telephone, an Internet access device, a personal digital assistant (PDA), a computer, or any other telecommunications apparatus. Emergency service communication device 735 may be distributed among multiple devices that together comprise element 735.

Figure 8:
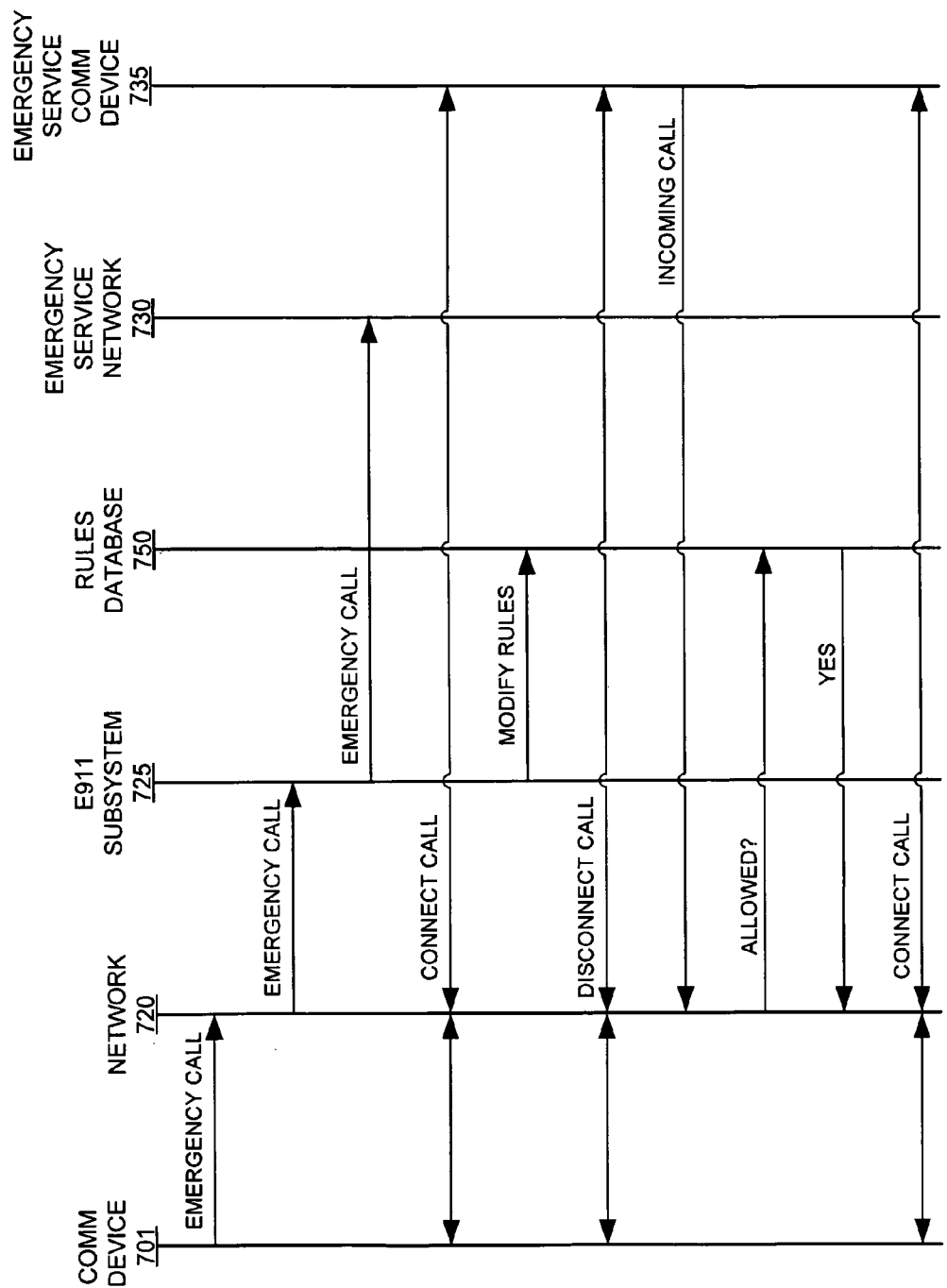
FIG. 8 is a sequence diagram that illustrates a method of operating a communication system.

FIG. 8 is a sequence diagram that illustrates an operation of communication system 700. A caller operating a communication device 701 places an emergency call to emergency service network 730, such as by dialing 9-1-1. The emergency call is received by network 720 and transferred to E911 subsystem 725. In response to receiving the emergency call, E911 subsystem connects communication device 701 to emergency service communication device 735 so that emergency assistance can be rendered. In addition, either simultaneously with connecting the call or immediately thereafter, E911 subsystem 725 transfers a message to rules database 750 to inform rules database 750 that communication device 701 has placed an emergency call and to request a modification of the rules associated with device 701. Rules database 750 receives the request to modify the call controls associated with communication device 701 and modifies the appropriate rules. The call controls, or rules, place certain restrictions on the use of communication device 701, such as a list of approved numbers from which incoming calls may be received, various time limits on incoming calls, denying incoming or outgoing calls after a predetermined amount of call minutes are exceed in a predetermined period, a time period during which incoming calls may be accepted or rejected, such as various times of the day or days of the week, or other call restrictions—including combinations thereof. Further, call controls may be associated with a specific caller, rather than a specific device. For example, the specific caller using communication device 701 to place the emergency call in FIG. 8 may have associated call controls.

When E911 subsystem 725 instructs rules database 750 to modify the rules associated with communication device 701, some or all of the call controls associated with communication device 701 may be modified for a predetermined time. For example, when instructed to modify the rules associated with communication device 701, all call controls associated with communication device 701 may be temporarily suspended for a period of one hour. By suspending the rules for a predetermined time period, any incoming calls to or outgoing calls from communication device 701 will not be restricted, in order to avoid any hindrance in responding to the emergency situation.

In addition, modifying call controls associated with the caller or communication device 701 could comprise modifying call controls for a predetermined time for all communication devices presently served by the base station or sector serving the communication device placing the emergency call. Further, modifying call controls could comprise modifying the call controls for all communication devices on the contact list of the communication device placing the emergency call, or for all communication devices that the communication device placing the emergency call has previously called or received calls from within a predetermined time period, such as one week or one month. In another example, modifying call controls associated with communication device 701 could comprise a global modification by modifying call controls for all communication devices within a predetermined geographical area associated with communication device 701, such as a half mile radius, square mile, or government jurisdiction like a city, county, or state. In order to perform such a global modification of call controls of all communication devices within a predetermined geographical area associated with communication device 701, the location of communication device 701 must be acquired through various location determination techniques known to those skilled in the art.

Referring again to FIG. 8, after rules database 750 modifies the rules associated with communication device 701, communication device 701 may then be disconnected from emergency service communication device 735, due to a network failure, user error, or through natural termination of the call, for example.

Subsequently, emergency service communication device 735 places an incoming call to communication device 701. For example, emergency service communication device 735 may attempt a call-back call to communication device 701 in order to re-establish communications if the original emergency call placed by device 701 was abruptly terminated. If communication device 701 or the user associated with device 701 has associated call control restrictions, the call may be blocked by network 720. In this example, since communication device 701 has associated call control restrictions, network 720 queries rules database 750 to determine if the incoming call to communication device 701 is allowed. Rules database 750 responds to the inquiry from network 720 and indicates that the incoming call from emergency service communication device 735 is allowed. For example, the call controls in rules database 750 may have been modified for a predetermined time period as discussed above, and the incoming call from emergency service communication device 735 may have been received during the predetermined time period. Since rules database 750 indicates that the incoming call from emergency service communication device 735 is allowed, network 720 connects the call from emergency service communication device 735 to communication device 701.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system to handle call-back calls from emergency services to callers, the method comprising:
receiving an emergency call for an emergency service from a caller number;
in response to the emergency call, modifying call controls associated with the caller number, wherein the call controls comprise at least one call restriction associated with the caller number and wherein modifying the call controls comprises modifying the at least one call restriction;
receiving an incoming call to the caller number, wherein the incoming call is directed to a same number as the caller number used for the emergency call;
processing the modified call controls associated with the caller number to determine if the incoming call is allowed;
if the incoming call is allowed, connecting the incoming call; and
if the incoming call is not allowed, blocking the incoming call.

2. The method of claim 1 further comprising, in response to the emergency call, modifying call controls associated with another party.

3. The method of claim 2 wherein the other party comprises a party identified in a contact list of a caller associated with the caller number.

4. The method of claim 2 wherein the other party comprises a party identified in a call history of a caller associated with the caller number.

5. The method of claim 2 further comprising identifying a party in a predetermined area surrounding the location of a caller associated with the caller number, and wherein the other party comprises the party in the predetermined area.

6. The method of claim 5 wherein the predetermined area comprises an area served by a cell handling the emergency call.

7. The method of claim 5 wherein the predetermined area comprises an area surrounding a global positioning system (GPS) location of the caller.

8. The method of claim 1 wherein modifying the call controls associated with the caller number comprises suspending the call controls associated with the caller number for a predetermined period of time.

9. The method of claim 1 wherein modifying the call controls associated with the caller number comprises permitting all incoming calls for a period of time.

10. A communication system to handle call-back calls from emergency services to callers, the communication system comprising:
a communication network configured to receive an emergency call for an emergency service from a caller number by a communication device operated by a caller, and receive an incoming call to the caller number for the communication device, wherein the incoming call is directed to a same number as the caller number used for the emergency call;
a call processing system configured to, in response to the emergency call, modify call controls associated with the caller number, and process the modified call controls associated with the caller number to determine if the incoming call is allowed, wherein the call controls comprise at least one call restriction associated with the caller number and wherein modifying the call controls comprises modifying the at least one call restriction; and
the communication network further configured to, if the incoming call is allowed, connect the incoming call, and if the incoming call is not allowed, block the incoming call.

11. The communication system of claim 10 wherein the call processing system is further configured to modify call controls of another party.

12. The communication system of claim 11 wherein the other party comprises a party on a calling plan of the caller.

13. The communication system of claim 11 wherein the other party comprises a party on a phone list of the caller.

14. The communication system of claim 11 wherein the other party comprises a party in a call history of the caller.

15. The communication system of claim 11 wherein the call processing system is further configured to identify a party in a predetermined area surrounding the location of the caller, and wherein the other party comprises the party in the predetermined area.

16. The communication system of claim 15 wherein the predetermined area comprises an area surrounding a cell tower serving the emergency call.

17. The communication system of claim 15 wherein the predetermined area comprises an area surrounding a global positioning system (GPS) position of the caller.

18. The communication system of claim 10 wherein the call processing system configured to modify the call controls associated with the caller number comprises the call processing system configured to suspend the call controls associated with the caller number for a predetermined period of time.

19. The communication system of claim 10 wherein the call processing system configured to modify the call controls associated with the caller number comprises the call processing system configured to permit all incoming calls for a predetermined period of time.

20. A call processing system for handling call-back calls from emergency services to callers, the call processing system comprising:
an interface configured to receive an emergency call request for an emergency call from a caller number by a communication device operated by a caller, and receive an incoming call request for an incoming call to the caller number, wherein the incoming call is directed to a same number as the caller number used for the emergency call; and
a processing system configured to, in response to the emergency call request, modify call controls associated with the caller number, process the modified call controls associated with the caller number to determine if the incoming call is allowed, if the incoming call is allowed, transfer an instruction to connect the incoming call, and if the incoming call is not allowed, block the incoming call, wherein the call controls comprise at least one call restriction associated with the caller number and wherein modifying the call controls comprises modifying the at least one call restriction.

\* \* \* \* \*